(12) United States Patent
Andersson (10) Patent No.: US 8,827,225 B2
(45) Date of Patent: Sep. 9, 2014

(54) SUSPENSION DEVICE

(75) Inventor: Mats Andersson, Rättvik (SE)

(73) Assignee: Lars Hammar, Bjursås (SE)

( * ) Notice: Subject to any disclaimer, the term of this patent is extended or adjusted under 35 U.S.C. 154(b) by 304 days.

(21) Appl. No.: 13/318,681

(22) PCT Filed: Mar. 26, 2010

(86) PCT No.: PCT/SE2010/050336
§ 371 (c)(1),
(2), (4) Date: Nov. 3, 2011

(87) PCT Pub. No.: WO2010/128929
PCT Pub. Date: Nov. 11, 2010

(65) Prior Publication Data
US 2012/0056065 A1 Mar. 8, 2012

(30) Foreign Application Priority Data
May 4, 2009 (SE) ...................................... 0900598

(51) Int. Cl.
*A47H 1/10* (2006.01)
(52) U.S. Cl.
USPC ......... 248/317; 248/309.1; 248/321; 248/324
(58) Field of Classification Search
USPC .............. 248/317, 321, 323, 324, 329, 330.1, 248/309.1, 316.1, 316.2, 316.8, 912, 689, 248/292.12, 58, 113, 48, 313
See application file for complete search history.

(56) References Cited

U.S. PATENT DOCUMENTS

| 338,248 | A | * | 3/1886 | Capron | 248/113 |
|---|---|---|---|---|---|
| 369,318 | A | * | 9/1887 | Craine | 248/113 |
| 502,033 | A | * | 7/1893 | Christ | 248/113 |
| 581,991 | A | * | 5/1897 | Homan | 24/514 |
| 1,071,222 | A | * | 8/1913 | Faucher | 248/113 |
| 1,332,086 | A | * | 2/1920 | Van Sickles | 248/113 |
| D398,833 | S | | 9/1998 | Hammar | |
| 5,938,259 | A | * | 8/1999 | Sawdon et al. | 294/116 |

(Continued)

FOREIGN PATENT DOCUMENTS

| GB | 2415738 | 1/2006 |
|---|---|---|
| JP | 2004-340354 | 12/2004 |
| SE | 434098 | 7/1984 |

*Primary Examiner* — Terrell McKinnon
*Assistant Examiner* — Monica Millner
(74) *Attorney, Agent, or Firm* — Dilworth & Barrese, LLP.

(57) ABSTRACT

A suspension device for suspending a sign or another article from an elongated object, which suspension device (1) comprises:—a base part (4);—a holder (3) connected to the base part;—two gripping shanks (10, 20) which are pivotally mounted to the base part and pivotable in relation to each other to and fro between an open position and a closed position, one of the gripping shanks being pivotable in relation to the base part about a first axis of pivotation and the other gripping shank being pivotable in relation to the base part about a second axis of pivotation, which extends in parallel with and at a distance from the first axis of pivotation;—at least one spring member (5a) acting between the gripping shanks; and—at least one gear mechanism (6a) with a first gear member (15a) rigidly connected to one of the gripping shanks and a second gear member (25a) rigidly connected to the other gripping shank, these gear members being in engagement with each other and arranged to be turned in relation to each other when the gripping shanks are pivoted in relation to each other.

12 Claims, 5 Drawing Sheets

(56) References Cited

U.S. PATENT DOCUMENTS

| | | |
|---|---|---|
| 7,080,812 B2 * | 7/2006 | Wadsworth et al. ....... 248/316.6 |
| D557,746 S | 12/2007 | Hammar |
| 7,337,934 B2 * | 3/2008 | Alling et al. .................. 224/401 |
| D634,788 S | 3/2011 | Andersson |
| 2002/0190176 A1 * | 12/2002 | Louh .......................... 248/316.4 |
| 2005/0263661 A1 * | 12/2005 | Park .......................... 248/292.12 |
| 2006/0145038 A1 * | 7/2006 | Chen .......................... 248/292.12 |
| 2008/0029674 A1 * | 2/2008 | Stearns .......................... 248/329 |
| 2008/0134554 A1 * | 6/2008 | Pitcher et al. .............. 40/606.14 |
| 2008/0283701 A1 * | 11/2008 | Kahn .......................... 248/213.2 |
| 2010/0025555 A1 * | 2/2010 | Shigio et al. ................ 248/284.1 |
| 2011/0192950 A1 * | 8/2011 | Liao .......................... 248/309.1 |
| 2012/0298823 A1 * | 11/2012 | Sun ........................... 248/309.1 |

\* cited by examiner

SUSPENSION DEVICE

FIELD OF THE INVENTION AND PRIOR ART

The present invention relates to a suspension device according to the preamble of claim 1 for suspending a sign or another article from an elongated object, such as for instance a cable, a wire or a pipe. The suspension device according to the invention can for instance be used for suspending a sign, a flag or a bird-scaring device from a wire or power line cable.

A suspension device according to the preamble of claim 1 is previously known from SE 434 098 B. This known suspension device is provided with two gripping shanks which are mounted to a base part through a common axis of pivotation.

OBJECT OF THE INVENTION

The object of the present invention is to provide a suspension device of the above-mentioned type with new and favourable design.

SUMMARY OF THE INVENTION

According to the invention, said object is achieved by means of a suspension device having the features defined herein.

The suspension device according to the invention comprises:
  a base part;
  a holder, which is connected to the base part and to which an article, such as a sign or the similar, is attached or intended to be attached;
  a first gripping shank and a second gripping shank, which are pivotally mounted to the base part and pivotable in relation to each other to and fro between an open position, in which the gripping shanks are pivoted away from each other to allow an elongated object to be inserted between the gripping shanks, and a closed position, in which the gripping shanks are pivoted towards each other to allow the gripping shanks to grip an object received between the gripping shanks and thereby clamp the suspension device to the object, the first gripping shank being pivotable in relation to the base part about a first axis of pivotation and the second gripping shank being pivotable in relation to the base part about a second axis of pivotation, which extends in parallel with and at a distance from the first axis of pivotation;
  at least one spring member acting between the gripping shanks, against the action of which the gripping shanks are pivotable from the closed position towards the open position; and
  at least one gear mechanism, which comprises a first gear member rigidly connected to the first gripping shank and a second gear member rigidly connected to the second gripping shank, said first and second gear members being in engagement with each other and arranged to be turned in relation to each other when the gripping shanks are pivoted in relation to each other.

The gear mechanism will guarantee that the two gripping shanks always pivot synchronously when they are made to pivot in relation to the base part, which implies that the first gripping shank always assumes the same angular position in relation to the base part as the second gripping shank. Hereby, a tilting of the base part in relation to the gripping shanks is prevented, and a tilting of the holder in relation to the gripping shanks is consequently also prevented. The design with a separate axis of pivotation for each gripping shank also entails that the spring force from the spring member acting between the gripping shanks can be used more efficiently and give a stronger clamping action of the gripping shanks as compared to the previously known design where the gripping shanks are pivotable about a common axis of pivotation. The design with a separate axis of pivotation for each gripping shank also entails that the height of the suspension device can be reduced as compared to the previously known design where the gripping shanks are pivotable about a common axis of pivotation, which makes it possible to reduce the consumption of material for producing the suspension device.

According to an embodiment of the invention, the suspension device comprises two gear mechanisms of the above-mentioned type arranged in parallel with each other on opposite sides of the base part. Hereby, the suspension device can be given a very stable and well-balanced construction.

Another embodiment of the invention is characterized in:
  that the suspension device comprises two covering plates arranged opposite each other, the first gear mechanism being covered on its outwardly facing side by a first one of these covering plates and the second gear mechanism being covered on its outwardly facing side by the other covering plate; and
  that these two covering plates are connected to each other through two pins extending between the covering plates and through the base part, the first gripping shank being pivotally mounted on a first one of these pins and the second gripping shank being pivotally mounted on the other pin.

The covering plates prevent access to the gear mechanisms from the lateral sides of the suspension device and will consequently reduce the risk of injuries caused by squeezing, whereas the pins act as fixing means for pivotal fixing of the gripping shanks to the base part and also as fixing means for the covering plates.

According to another embodiment of the invention, the respective pin is fixedly connected to one of said covering plates and arranged to engage with a fixing member of the other covering plate, which fixing member is adapted to the pin, in order to secure the covering plates in relation to each other. Hereby, the covering plates and the pins connected to the covering plates can be used in order to achieve a simple and rapid assembling of the gripping shanks, the base part and the covering plates.

Other favourable features of the suspension device according to the invention will appear from the dependent claims and the following description.

BRIEF DESCRIPTION OF THE DRAWINGS

The invention will in the following be more closed described by means of embodiment examples, with reference to the appended drawings. It is shown in.

DETAILED DESCRIPTION OF PREFERRED EMBODIMENTS

Figure 1:
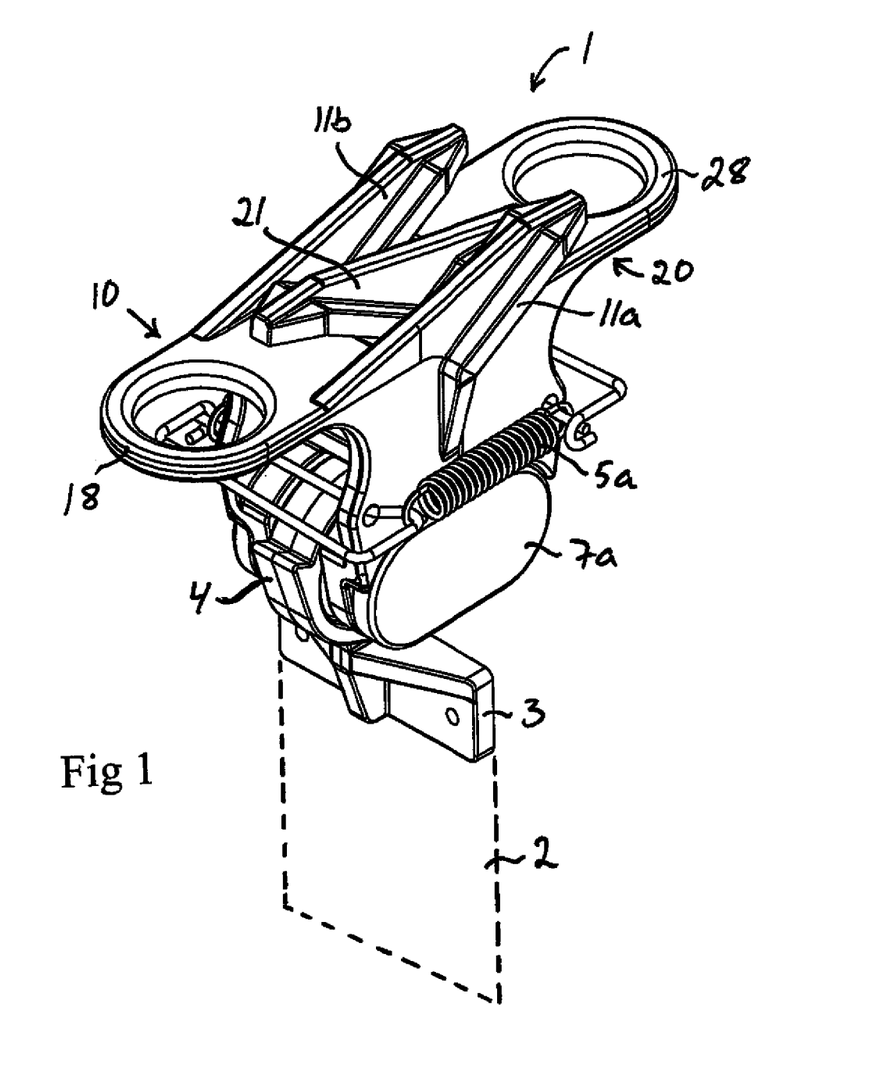
FIG. 1 a perspective view of a suspension device according to an embodiment of the present invention, with the gripping shanks of the suspension device in closed position, FIG. 2 a partly exploded perspective view of the suspension device of FIG. 1, with the gripping shanks in open position, FIG. 3 a perspective view of the suspension device of FIG. 1, with the gripping shanks in closed position and with one of the covering plates removed, FIG. 4 a lateral view of the suspension device of FIG. 1, with the gripping shanks in closed position and with one of the covering plates removed, FIG. 5 a perspective view of the suspension device of FIG. 1, with the gripping shanks in open position and with one of the covering plates removed, FIG. 6 a lateral view of the suspension device of FIG. 1, with the gripping shanks in open position and with one of the covering plates removed, and FIG. 7 a planar view from above of the suspension device of FIG. 1, with the gripping shanks in open position.

The suspension device 1 according to the invention is intended to be used for suspending an article 2 (schematically indicated with broken lines in FIG. 1) form an elongated object, such as for instance a cable, a wire or a pipe. The article 2 is attached to a holder 3 of the suspension device, which holder 3 is connected to a base part 4. In the illustrated example, the holder 3 is rigidly connected to the base part 4 and they are advantageously formed in one piece.

The article that is attached or intended to be attached to the holder 3 may for instance be a sign or a flag. The article could also be a device designed for scaring away birds, for instance of the type shown in WO 2006/011990 A2.

A first gripping shank 10 and a second gripping shank 20 are pivotally mounted to the base part 4 and pivotable in relation to each other to and fro between an open position (see FIGS. 2, 5, 6 and 7), in which the gripping shanks 10, 20 are pivoted away from each other to allow an elongated object to be inserted between the gripping shanks, and a closed position (see FIGS. 1, 3 and 4), in which the gripping shanks 10, 20 are pivoted towards each other to allow the gripping shanks to grip an object received between the gripping shanks and thereby clamp the suspension device 1 to the object. The first gripping shank 10 is pivotable in relation to the base part 4 about a first axis of pivotation S1 and the second gripping shank 20 is pivotable in relation to the base part 4 about a second axis of pivotation S2, which extends in parallel with and at a distance from the first axis of pivotation S1.

In the illustrated embodiment, the first gripping shank 10 is provided with two mutually parallel gripping prongs 11a, 11b directed towards the second gripping shank 20, whereas the second gripping shank 20 is provided with a centrally arranged gripping prong 21, which is directed towards the first gripping shank 10 and which is received between the two gripping prongs 11a, 11b of the first gripping shank when the gripping shanks are in the closed position. On their gripping surfaces facing each other, the gripping shanks are with advantage provided with areas 12, 22 of friction enhancing material, such as for instance rubber.

One or more spring members 5a, 5b are arranged to act between the gripping shanks 10, 20. In the illustrated example, the suspension device 1 comprises two such spring members 5a, 5b in the form of tension springs arranged in parallel with each other on opposite sides of the base part 4. The gripping shanks 10, 20 are pivotable from the closed position towards the open position against the action of these spring members 5a, 5b. The respective spring member 5a, 5b is fastened between the gripping shanks 10, 20 and extends between an attachment point 13 of the first gripping shank 10 and an attachment point 23 of the second gripping shank 20. These attachment points 13, 23 are located on the gripping shanks in such a manner that they are above the axes of pivotation S1, S2 of the gripping shanks when the gripping shanks 10, 20 are in the closed position and below the axes of pivotation S1, S2 when the gripping shanks are in the open position. When the gripping shanks 10, 20 are in such a rotary position that the attachment points 13, 23 of the spring members are above the axes of pivotation S1, S2, the spring members 5a, 5b strive to move the gripping shanks to the closed position, and when the gripping shanks are in such a rotary position that the attachment points 13, 23 of the spring members are below the axes of pivotation S1, S2, the spring members 5a, 5b strive to move the gripping shanks to the open position. The pivotability of the gripping shanks in the direction away from each other is limited by stop lugs 9a, 9b on the base part 4. In the open position, the gripping shanks 10, 20 bear on a respective one of these stop lugs 9a, 9b.

In the illustrated example, the spring members 5a, 5b are at one end attached to the first gripping shank 10 by means of a first mounting clamp 14 and at the other end attached to the second gripping shank 20 by means of a second mounting clamp 24.

One or more gear mechanisms 6a, 6b are arranged to act between the gripping shanks 10, 20. In the illustrated example, the suspension device 1 comprises two such gear mechanisms 6a, 6b arranged in parallel with each other on opposite sides of the base part 4. The respective gear mechanism 6a, 6b comprises a first gear member 15a, 15b rigidly connected to the first gripping shank 10 and a second gear member 25a, 25b rigidly connected to the second gripping shank 20. The first gripping member 15a, 15b of the respective gear mechanism is pivotable about the first axis of pivotation S1, and the second gear member 25a, 25b of the respective gear mechanism is pivotable about the second axis of pivotation S2. The two gear members 15a, 25b of the first gear mechanism 6a are in engagement with each other and arranged to be turned in relation to each other when the gripping shanks 10, 20 are pivoted in relation to each other. In the same way, the two gear members 15b, 25b of the second gear mechanism 6b are in engagement with each other and arranged to be turned in relation to each other when the gripping shanks 10, 20 are pivoted in relation to each other.

When one gripping shank is pivoted about its axis of pivotation, the gear mechanisms 6a, 6b will force the other gripping shank to perform a corresponding pivotal movement, but in the opposite direction of rotation, about its axis of pivotation. Hereby, the gripping shanks 10, 20 will always pivot synchronously and in mutually opposite directions of rotation about their axes of pivotation S1, S2 when a pivotal movement is applied to the gripping shanks. The respective gripping shank 10, 20 and the gear members connected to this gripping shank are suitably formed in one piece.

In the illustrated embodiment, the respective gripping shank 10, 20 is provided with two parallelly protruding legs 16a, 16b, 26a, 26b, which extend on opposite sides of the base part 4 and through which the gripping shank is pivotally mounted to the base part. The respective leg 16a, 16b, 26a, 26b has a through hole for receiving a pivot pin 17, 27 and the outer edge of the leg has a section which is provided with cogs in order to form one of the above-mentioned gear members.

Figure 2:
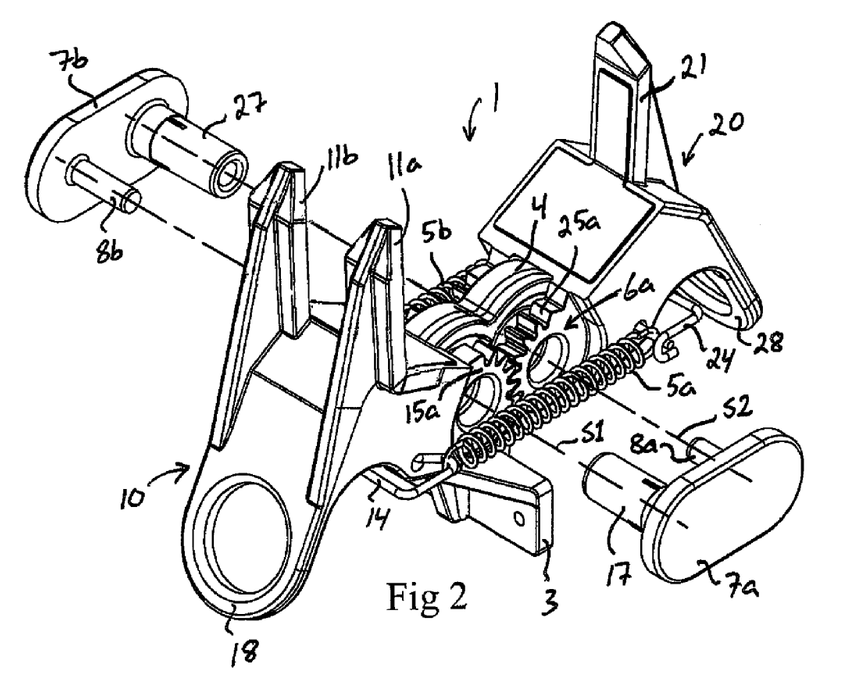
Figure 3:
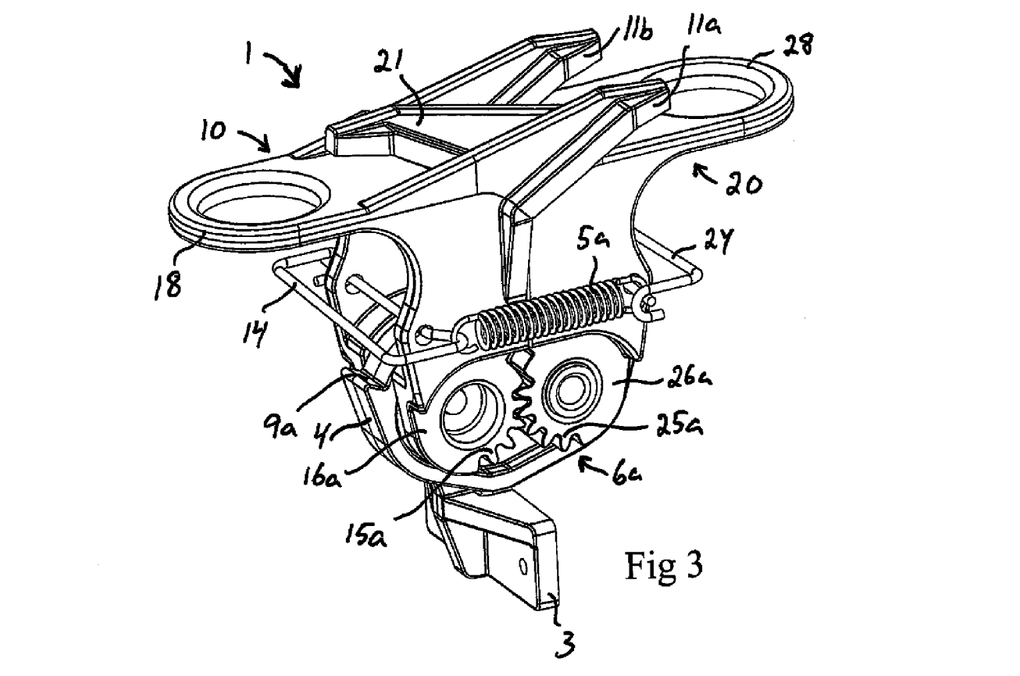
Figure 4:
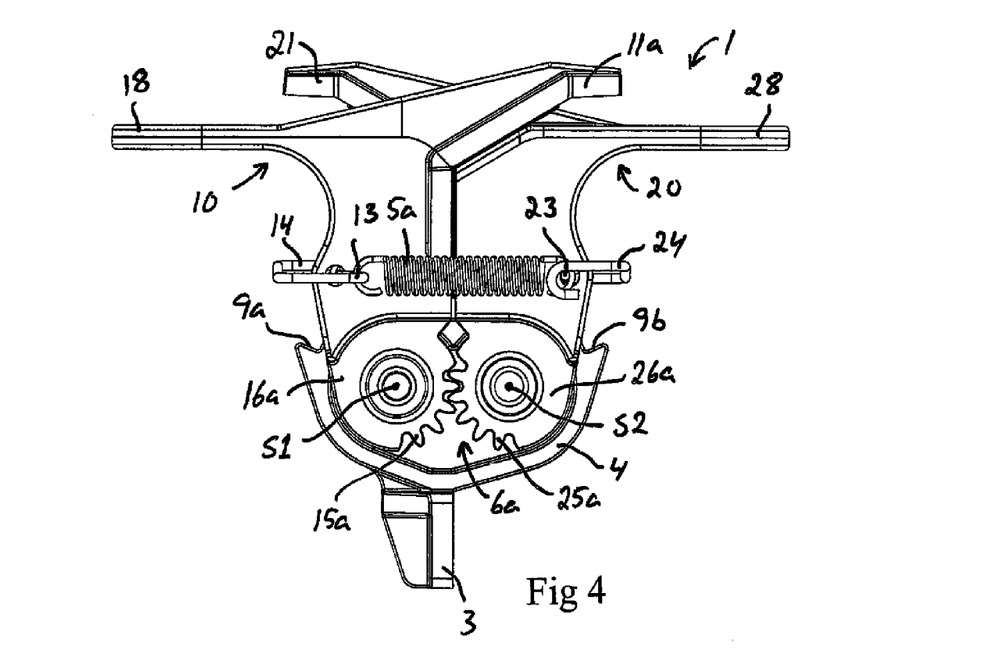
Figure 5:
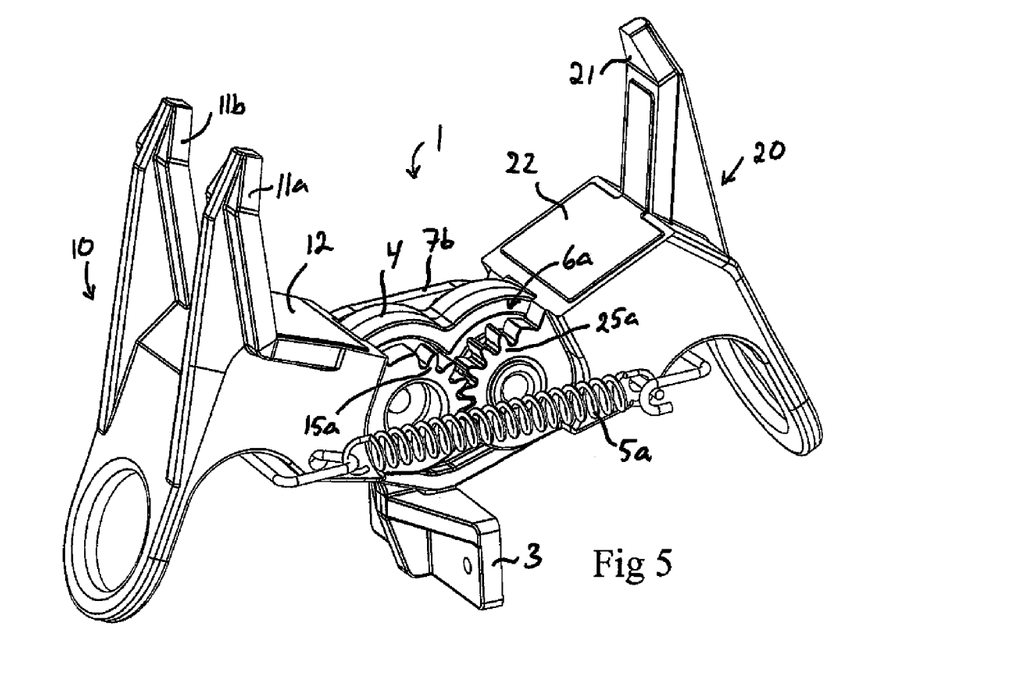
Figure 6:
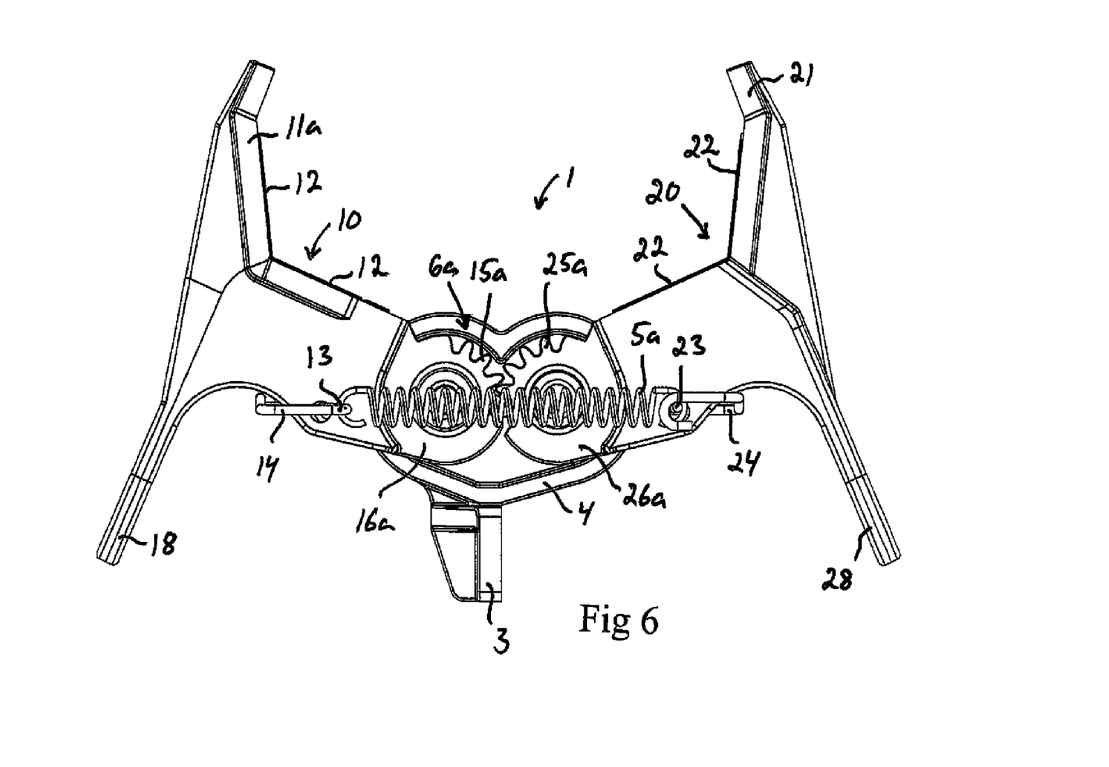
Figure 7:
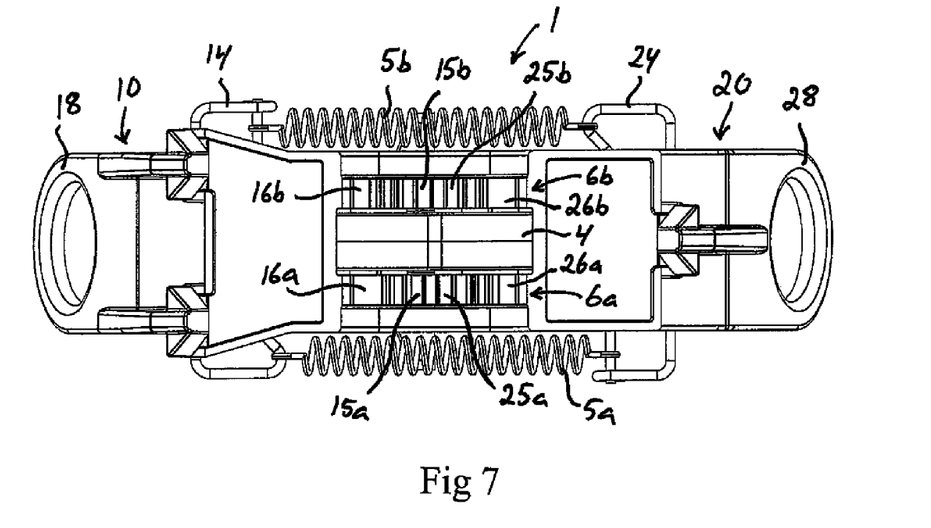

In the illustrated embodiment, the suspension device 1 further comprises two covering plates 7a, 7b arranged opposite each other, which are shown in a disassembled state in FIG. 2. In FIGS. 3-6, the suspension device 1 is shown with one covering plate 7a removed, for improved clarity. The first gear mechanism 6a is on its outwardly facing side covered by one covering plate 7a and the second gear mechanism 6b is on its outwardly facing side covered by the other covering plate 7b. The covering plates 7a, 7b are connected to each other through two pins 17, 27, which extend between the covering plates and through the base part 4 and which form pivot pins for the gripping shanks 10, 20. The first gripping shank 10 is pivotally mounted on one pin 17 and the second gripping shank is pivotally mounted on the other pin 27. In the illustrated example, one pin 17 is fixedly connected to one 7a of the covering plates and arranged to engage with a fixing member 8b of the other covering plate 7b, which fixing member is adapted to the pin, whereas the other pin 27 is fixedly connected to the other covering plate 7b and arranged to engage with a fixing member 8a of the first-mentioned covering plate 7a, which fixing member is adapted to the pin. By engagement between the pins 17, 27 and the fixing members 8b, 8a, the covering plates 7a, 7b are locked in relation to each other. Furthermore, the gripping shanks 10, 20 are secured to the base part 4 by means of the pins 17, 27 and the covering plates 7a, 7b. The respective fixing member 8a, 8b suitably has the form of a plug which is received with press fit in a recess arranged in the outer end of the associated pin 27, 17.

In order to facilitate the manoeuvring of the gripping shanks between closed position and open position, the first gripping shank 10 is provided with a protruding first handle 18 on its side facing away from the second gripping shank 20, and the second gripping shank 20 is provided with a protruding second handle 28 on its side facing away from the first gripping shank 10. These handles 18, 28 are intended to be gripped by a user with the hands or with a tool in order to pivot the gripping shanks 10, 20 about the respective axis of pivotation S1, S2.

The invention is of course not in any way restricted to the embodiments described above. On the contrary, several possibilities to modifications thereof should be apparent to a person skilled in the art without thereby deviating from the basic idea of the invention as defined in the appended claims.

The invention claimed is:

1. A suspension device for suspending a sign or another article from an elongated object, which suspension device (1) comprises:
   a base part (4);
   a holder (3), which is connected to the base part (4) and to which an article is attachable;
   a first gripping shape (10) and a second gripping shank (20), which are pivotally mounted to the base part (4) and pivotable in relation to each other to and fro between an open position, in which the gripping shanks (10, 20) are pivoted away from each other to allow an elongated object to be inserted between the gripping shanks, and a closed position, in which the gripping shanks (10, 20) are pivoted towards each other to allow the n in shanks, to grip an object received between the gripping shanks and thereby clamp the suspension device (1) to the object; and
   at least one spring member (5a) acting between the gripping shanks, against the action of which the gripping shanks (10, 20) are pivotable from the closed position towards the open position, wherein
   the first gripping shank (10) is pivotable in relation to the base part (4) about a first pivotal axis (S1);
   the second gripping shank (20) is pivotable in relation to the base part (4) about a second pivotal axis (S2), which extends in parallel with and at a distance from the first pivotal axis (S1);
   the suspension device (1) comprises at least one gear mechanism (6a), which comprises a first gear member (15a) rigidly connected to the first gripping shank (10) and a second gear member (25a) rigidly connected to the second gripping shank (20), said first and second gear members (15a, 25a) being in engagement with each other and arranged to be turned in relation to each other when the gripping shanks (10, 20) are pivoted in relation to each other;

said gear mechanism (6a) constitutes a first gear mechanism of the suspension device (1):
   the suspension device (1) also comprises a second gear mechanism (6b), which comprises a first gear member (15b) rigidly connected to the first gripping shank (10) and a second gear member (25b) rigidly connected to the second gripping shank (20), said first and second gear members (15b, 25b) of the secons gear mechanism (6b) being in engagement with each other and arranged to be turned in relation to each other when the gripping shanks (10, 20) are pivoted in relation to each other;
   the first gear mechanism (6a) and second gear mechanism (6b) are arranged in parallel with each other on opposite sides of the base part (4);
   the suspension device (1) comprises two covering plates (7a, 7b) arranged opposite each other, the first gear mechanism (6a) being covered on its outwardly facing side by a first one (7a) of these covering plates (7a, 7b) and the second gear mechanism (6b) being covered on its outwardly facing side by the other covering plate (7b); and
   these two covering plates (7a, 7b) are connected to each other through two pins (17, 27) extending between the covering plates and through the base part (4), the first gripping shank (10) being pivotally mounted on a first one (17) of these pins and the second gripping shank (20) being pivotally mounted on the other pin (27).

2. A suspension device according to claim 1, wherein the respective pin (17, 27) is fixedly connected to one of said covering plates (7a, 7b) and arranged to engage with a fixing member (8a, 8b) of the other covering plate, which fixing member is adapted to the pin, in order to secure the covering plates to each other.

3. A suspension device according to claim 1, wherein the respective gripping shank (10, 20) and the gear member or gear members (15a, 15b, 25a, 25b) connected to this gripping shank are formed in one piece.

4. A suspension device according to claim 1, wherein the first gripping member (15a, 15b) of the respective gear mechanism (6a, 6b) is pivotable about the first pivotal axis (S1), and the second gear member (25a, 25b) of the respective gear mechanism (6a, 6b) is pivotable about the second pivotal axis (S2).

5. A suspension device according to claim 1, wherein the holder (3) is rigidly connected to the base part (4), the holder and the base part preferably being formed in one piece.

6. A suspension device for suspending a sign or another article from an elongated object, which suspension device (1) comprises;
   a base part (4);
   a holder (3), which is connected to the base part (4) and to which an article is attachable;
   a first gripping shank (10) and a second gripping shank (20), which are pivotally mounted to the base part (4) and pivotable in relation to each other to and fro between an open position, in which the gripping shanks (10, 20) are pivoted away from each other to allow an elongated object to be inserted between the gripping shanks, and a closed position, in which the gripping shanks (10, 20) are pivoted towards each other to allow the gripping shanks to grip an object received between the gripping shanks and thereby clamp the suspension device (1) to the object; and
   at least one spring member (5a) acting between the gripping shanks, against the action of which the gripping shanks (10, 20) are pivotable from the closed position towards the open position, wherein the first gripping shank (10) is pivotable in relation to the base part (4) about a first pivotal axis (S1);

the second gripping shank (20) is pivotable in relation to the base part (4) about a second pivotal axis (S2), which extends in parallel with and at a distance from the first pivotal axis (S1);

the suspension device (1) comprises at least one gear mechanism (6a), which comprises a first gear member (15a) rigidly connected to the first gripping shank (10) and a second gear member (25a) rigidly connected to the second gripping shank (20), said first and second gear members (15a, 25a) being in engagement with each other and arranged to be turned in relation to each other when the gripping shanks (10, 20) are pivoted in relation to each other;

said spring member (5a) constitutes a first spring member of the suspension device (1);

the suspension device (1) also comprises a second spring member (5b) acting between the gripping shanks (10, 20), against the action of which the gripping shanks (10, 20) are pivotable from the closed position towards the open position; and the first spring member (5a) and the second spring member (5b) are arranged in parallel with each other on opposite sides of the base part (4).

7. A suspension device according to claim 6, wherein the respective spring member (5a, 5b) is a tension spring.

8. A suspension device according to claim 7, wherein the respective spring member (5a, 5b) extends between an attachment point (13) of the first gripping shank (10) and an attachment point (23) of the second gripping shank (20); and said attachment points (13, 23) are located on the gripping shanks (10, 20) in such a manner that said attachment points (13, 23) are located on one side of said pivotal axes (S1, S2) when the gripping shanks (10, 20) are in the closed position and said attachment points (13, 23) are located on an opposite side of the pivotal axes (S1, S2) when the gripping shanks (10, 20) are in the open position.

9. A suspension device according to claim 2, wherein the respective gripping shank (10, 20) and the gear member or gear members (15a, 15b, 25a, 25b) connected to this gripping shank are formed in one piece.

10. A suspension device according to claim 9, wherein the first gripping member (15a, 15b) of the respective gear mechanism (6a, 6b) is pivotable about the first pivotal axis (S1), and the second gear member (25a, 25b) of the respective gear mechanism (6a, 6b) is pivotable about the second pivotal axis (S2).

11. A suspension device according to claim 3, wherein the first gripping member (15a, 15b) of the respective gear mechanism (6a, 6b) is pivotable about the first pivotal axis (S1), and the second gear member (25a, 25b) of the respective gear mechanism (6a, 6b) is pivotable about the second pivotal axis (S2).

12. A suspension device according to claim 2, wherein the first gripping member (15a, 15b) of the respective gear mechanism (6a, 6b) is pivotable about the first pivotal axis (S1), and the second gear member (25a, 25b) of the respective gear mechanism (6a, 6b) is pivotable about the second pivotal axis (S2).

* * * * *

UNITED STATES PATENT AND TRADEMARK OFFICE
CERTIFICATE OF CORRECTION

PATENT NO. : 8,827,225 B2  
APPLICATION NO. : 13/318681  
DATED : September 9, 2014  
INVENTOR(S) : Mats Andersson Page 1 of 1

It is certified that error appears in the above-identified patent and that said Letters Patent is hereby corrected as shown below:

IN THE CLAIMS

Column 5, line 38, "a first gripping shape (10)" should read -- a first gripping shank (10) --.

Column 5, line 45, "the n in shanks," should read -- the gripping shanks, --.

Column 6, line 8, "the secons gear mechanism (6b)" should read -- the second gear mechanism (6b) --.

Signed and Sealed this  
Twentieth Day of October, 2015

Michelle K. Lee  
*Director of the United States Patent and Trademark Office*